(12) United States Patent
El-Gayyar et al.

(10) Patent No.: US 10,798,796 B1
(45) Date of Patent: *Oct. 6, 2020

(54) DIMMER SWITCH SYSTEM WITH SINGLE WIRE TWO-WAY COMMUNICATION ARCHITECTURE

(71) Applicant: EATON INTELLIGENT POWER LIMITED, Dublin (IE)

(72) Inventors: Ahmed El-Gayyar, Senoia, GA (US); Sumeet T. Raghavani, Pune (IN); Kevin Zhong, Shanghai (CN); Saivaraprasad Murahari, Peachtree City, GA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,916

(22) Filed: Dec. 23, 2019

(51) Int. Cl.
| | |
|---|---|
| *H05B 33/08* | (2020.01) |
| *H05B 47/10* | (2020.01) |
| *H05B 45/10* | (2020.01) |
| *H05B 39/06* | (2006.01) |

(52) U.S. Cl.
CPC ............. *H05B 47/10* (2020.01); *H05B 39/06* (2013.01); *H05B 45/10* (2020.01)

(58) Field of Classification Search
CPC .............. H05B 33/0815; H05B 33/086; H05B 33/0878; H05B 47/16; H05B 47/18; H05B 47/155; H05B 47/185; H05B 45/10; H05B 45/20; H05B 45/33

USPC ........................................ 315/307, 312, 360
See application file for complete search history.

(56) References Cited

U.S. PATENT DOCUMENTS

| | | | |
|---|---|---|---|
| 7,012,518 B2 | 3/2006 | Novikov | |
| 2009/0278479 A1* | 11/2009 | Platner | H05B 47/155 315/312 |
| 2012/0025717 A1* | 2/2012 | Klusmann | H05B 47/18 315/152 |
| 2012/0056712 A1* | 3/2012 | Knode | H05B 47/19 340/3.7 |
| 2013/0030589 A1* | 1/2013 | Pessina | H05B 47/19 700/295 |
| 2014/0091732 A1* | 4/2014 | Lekatsas | H05B 45/37 315/307 |
| 2017/0135184 A1* | 5/2017 | Fischer | H05B 47/11 |
| 2017/0223808 A1* | 8/2017 | Barna | H04W 24/08 |

* cited by examiner

*Primary Examiner* — Tung X Le
(74) *Attorney, Agent, or Firm* — Eckert Seamans Cherin & Mellott, LLC

(57) ABSTRACT

A dimmer switch system for dimming a load includes a master dimmer structured to be electrically connected to a power source and the load and to control dimming of the load by regulating power provided from the power source to the load, and at least one accessory dimmer structured to be electrically connected to the master dimmer via a traveler conductor. The master dimmer is structured to generate a first control signal on the traveler conductor during one of a positive or negative half-cycle of power from the power source. The at least one accessory dimmer is structured to generate a second control signal on the traveler conductor during the other of the positive or negative half-cycle of power from the power source.

20 Claims, 6 Drawing Sheets

DIMMER SWITCH SYSTEM WITH SINGLE WIRE TWO-WAY COMMUNICATION ARCHITECTURE

BACKGROUND

Field

The disclosed concept relates generally to dimmer switches, and in particular, to dimmer switch systems with multiple dimmer switches. The disclosed concept also relates to communication structures within dimmer switch systems.

Background Information

Dimmer switches provide a dimming function for loads such as lights. Dimmer switch systems may comprise a single dimmer or multiple dimmers arranged, for example, as a master dimmer and one or more accessory dimmers. Other devices, such as a three-way toggle switch may also be employed in dimmer switch systems. In a dimmer system comprising multiple dimmers or other devices, the multiple dimmers or other devices likely need a mechanism to communicate with each other. For example, accessory dimmers need to be able to communicate inputs received at the accessory dimmer to the master dimmer in order for the master dimmer to correspondingly adjust dimming based on the inputs received at the accessory dimmer. Similarly, the master dimmer may need to provide status updates to the accessory dimmers or other devices connected to it. Communication between dimmers or other devices may be facilitated by either one or more traveler wires connecting the dimmers or other devices. Systems with a single traveler wire can be problematic as conflicts can arise when multiple dimmers or other devices simultaneously attempt to communicate via the single traveler wire.

There is thus room for improvement within dimmer switch systems.

SUMMARY

These needs and others are met by embodiments of the disclosed concept in which a dimmer switch system includes a master dimmer and at least one accessory dimmer, where the master dimmer and accessory dimmer(s) communicate using a single traveler wire, with the master dimmer transmitting signals during one portion of the power supply phase and the accessory dimmer transmitting signals during another portion of the power supply phase. In addition, each of the master dimmer and accessory dimmer(s) comprises a load status indicator that reflects the current dimming level of a load connected to the master dimmer.

In accordance with one aspect of the disclosed concept, a dimmer switch system for dimming a load comprises: a master dimmer structured to be electrically connected to a power source and the load and to control dimming of the load by regulating power provided from the power source to the load; and at least one accessory dimmer structured to be electrically connected to the master dimmer via a traveler conductor; wherein the master dimmer is structured to generate a first control signal on the traveler conductor during one of a positive or negative half-cycle of power from the power source, and wherein the at least one accessory dimmer is structured to generate a second control signal on the traveler conductor during the other of the positive or negative half-cycle of power from the power source.

In accordance with another aspect of the disclosed concept, a method of dimming a load comprises: electrically connecting a master dimmer between a power source and the load and controlling dimming of the load by regulating power provided from the power source to the load with the master dimmer; electrically connecting at least one accessory dimmer to the master dimmer via a traveler conductor; structuring the master dimmer to generate a first control signal on the traveler conductor during one of a positive or negative half-cycle of power from the power source; and structuring the at least one accessory dimmer to generate a second control signal on the traveler conductor during the other of the positive or negative half-cycle of power from the power source.

In accordance with another aspect of the disclosed concept, a dimmer switch system for dimming a load, the dimmer switch system comprises: a master dimmer structured to be electrically connected to a power source and the load and to control dimming of the load by regulating power provided from the power source to the load; and at least one accessory dimmer structured to be electrically connected to the master dimmer via a traveler conductor; wherein the master dimmer is structured to generate a first control signal on the traveler conductor, and wherein the at least one accessory dimmer is structured to generate a second control signal on the traveler conductor.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "processing unit" shall mean a programmable analog and/or digital device that can store, retrieve, and process data; a microprocessor; a microcontroller; a microcomputer; a central processing unit; or any suitable processing device or apparatus.

Figure 1:
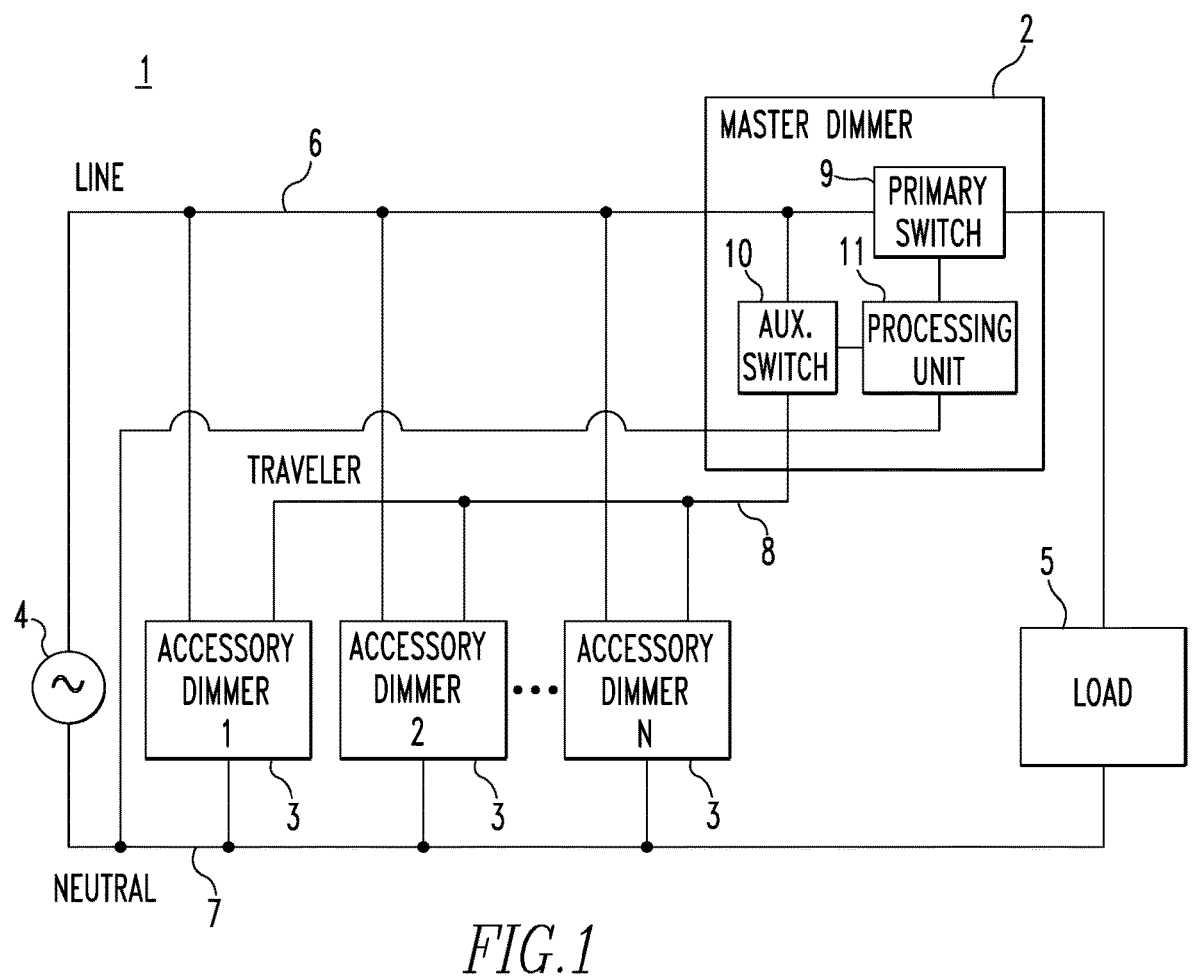
FIG. 1 is a schematic diagram of a dimmer switch system including a master dimmer and number of accessory dimmers in accordance with an example embodiment of the disclosed concept.

FIG. 1 is a schematic diagram of a dimmer switch system 1 including a master dimmer 2 and number of accessory dimmers 3 in accordance with an example embodiment of the disclosed concept. A number N of accessory dimmers 3 is shown in FIG. 1, and it will be appreciated that dimmer switch system 1 can include one accessory dimmer 3 or more than one accessory dimmer 3 without departing from the scope of the disclosed concept. The master dimmer 2 and accessory dimmers 3 are electrically connected to a power source 4 via line and neutral conductors 6,7 and are powered by the power source 4. The master dimmer 2 is electrically connected to the power source 4 and a load 5. Master dimmer 2 and accessory dimmers 3 are electrically connected to one another by a traveler conductor 8. Master dimmer 2 includes a primary semiconductor switch 9, a master auxiliary semiconductor switch 10, and a master processing unit 11. In one exemplary embodiment, primary semiconductor switch 9 and master auxiliary semiconductor switch 10 are TRIAC switches. However, it will be appreciated that other types of semiconductor switches may be employed without departing from the scope of the disclosed concept. Primary semiconductor switch 9 is electrically connected between power source 4 and load 5 by line conductor 6 and directly regulates the amount of power provided to load 5 by power source 4. Dimming of the load is achieved by changing the conduction angle of primary semiconductor switch 9. Adjusting the conduction angle of primary semiconductor switch 9 produces proportional adjustments to the amount of power provided to load 5, for example by performing forward or reverse phase cutting of the power provided to the load 5.

Figure 2A:
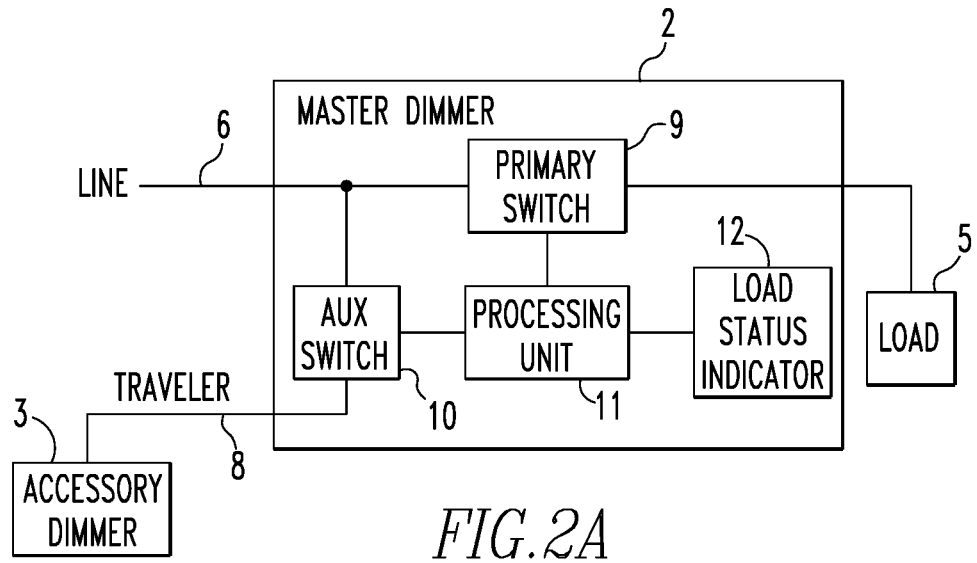
FIG. 2A is a schematic diagram of the master dimmer of FIG. 1 shown in more detail in accordance with an example embodiment of the disclosed concept.
Figure 2B:
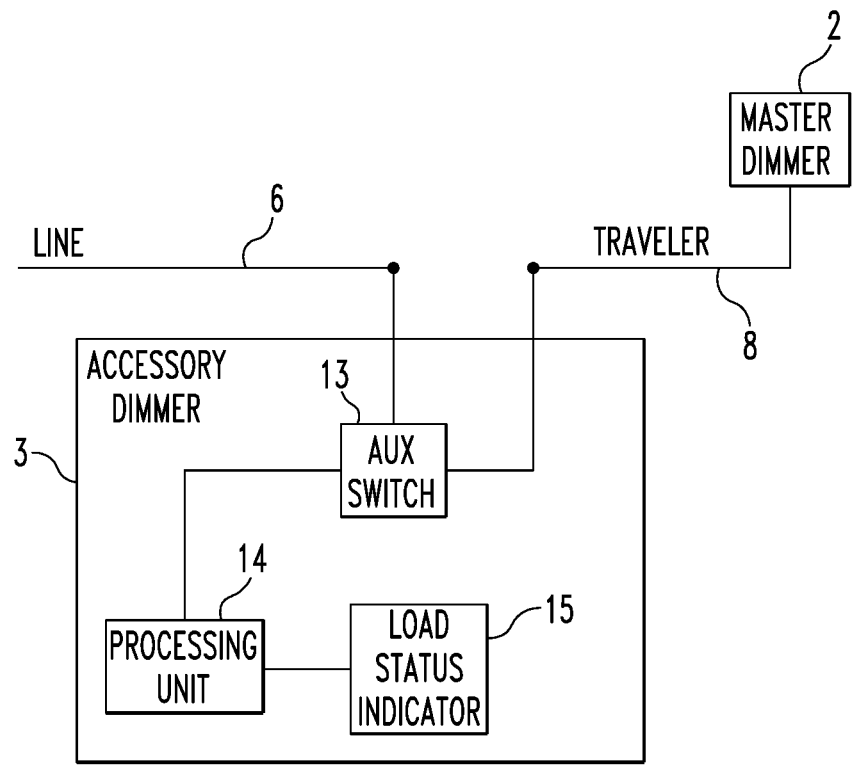
FIG. 2B is a schematic diagram of an accessory dimmer of FIG. 1 shown in more detail in accordance with an example embodiment of the disclosed concept.

FIGS. 2A and 2B are schematic diagrams of master dimmer 2 and accessory dimmers 3 of FIG. 1 shown in more detail in accordance with example embodiments of the disclosed concept. In FIG. 2A, master dimmer 2 further includes a master load status indicator 12. Master load status indicator 12 provides an indication of how much power is being provided to the load. In one exemplary embodiment, master load status indicator 12 is an indicator (e.g., a series of LEDs) that provides a visual indication of a dimming level of the load 5. However, it will be appreciated that other types of indicators may be employed to indicate how much power is being provided to the load without departing from the scope of the disclosed concept. Master auxiliary semiconductor switch 10 is electrically connected between line conductor 6 and traveler conductor 8, which in turn is connected to accessory dimmers 3. Master processing unit 11 is electrically connected to primary semiconductor switch 9 and auxiliary semiconductor switch 10. Master processing unit 11 is structured to adjust the conduction angle of primary semiconductor switch 9 based on, for example, signals received from accessory dimmers 3 or adjustments received at master dimmer 2. It will be appreciated that adjustments received at master dimmer 2 may be received through user input to controls or other means on master dimmer 2 without departing from the scope of the disclosed concept. Master processing unit 11 is also structured to control master auxiliary semiconductor switch 10 to selectively allow power to flow from line conductor 6 to traveler conductor 8. Said power flowing to traveler conductor 8 operates as a control signal that is provided to other components electrically connected to traveler conductor 8.

In FIG. 2B, accessory dimmer 3 includes an accessory auxiliary semiconductor switch 13, an accessory processing unit 14, and an accessory load status indicator 15. In one exemplary embodiment, accessory load status indicator 15 is an indicator (e.g., a series of LEDs) that provides a visual indication of a dimming level of the load 5. However, it will be appreciated that other types of indicators may be employed to indicate how much power is being provided to the load without departing from the scope of the disclosed concept. Accessory auxiliary semiconductor switch 13 is electrically connected between line conductor 6 and traveler conductor 8. Accessory auxiliary semiconductor switch 13 is also electrically connected to accessory processing unit 14. Accessory auxiliary processing unit 14 is structured to control accessory auxiliary switch 13 to selectively allow power to flow from line conductor 6 to traveler conductor 8. Said power flowing to traveler conductor 8 operates as a control signal that is provided to other components electrically connected to traveler conductor 8.

In an example embodiment of dimmer switch system 1 of the disclosed concept, only primary semiconductor switch 9 directly regulates the amount of power provided to load 5 by power source 4. When master dimmer 2 is adjusted for the purpose of dimming the load, master processing unit 11 adjusts the conduction angle of primary semiconductor switch 9 to proportionally adjust the power provided to load 5 (e.g., by performing a forward or reverse phase cut of the power), and updates master load status indicator 12 to indicate the dimming level of load 5 after the adjustment. Master processing unit 11 subsequently controls master auxiliary semiconductor switch 10 to close to allow power from line conductor 6 to flow to traveler conductor 8, which acts as a control signal that is received by all accessory dimmers 3 connected to traveler conductor 8 indicating the dimming level of load 5. Information is encoded into the control signal based on an amount of time after a zero crossing in power from power source 4 that power from line conductor 6 is allowed to flow onto traveler conductor 8. For example, generating the control signal 1.5 ms after the zero crossing may indicate a first dimming level and generating the control signal 2.5 ms after the zero crossing may indicate a second dimming level. Accessory processing unit 14 within each accessory dimmer 3 updates its accessory load status indicator 15 based on the control signal received via traveler conductor 8 to indicate the dimming level of load 5.

In another exemplary embodiment of the disclosed concept, master load status indicator 12 and accessory load status indicator 15 each contain a series of LEDs wherein each LED indicates a specific dimming level, such that only one LED is lit at a time to indicate the current dimming level of the load. In this exemplary embodiment, for a dimmer system with seven possible levels of dimming, master load status indicator 12 and accessory load status indicator 15 would be comprised of seven LEDs, with LED 1 corresponding to the lowest level of dimming, LED 7 corresponding to the highest level of dimming, and LED 4 corresponding to an intermediate level of dimming. However, it will be appreciated that other types of indicators may be employed to indicate how much power is being provided to the load without departing from the scope of the disclosed concept. It will also be appreciated that in some example embodiments, as will be described in more detail herein, the dimming level of load 5 may include an on/off designation.

In order to change the amount of power provided to load 5 using an accessory dimmer 3, an accessory dimmer 3 similarly transmits a control signal via traveler conductor 8 to master dimmer 2 to initiate the desired change. The control signal from an accessory dimmer 3 to master dimmer 2 may be a command to turn off, turn on, dim up, or dim down load 5, for example. After an accessory dimmer 3 is adjusted for the purpose of dimming load 5, accessory processing unit 14 controls accessory auxiliary semiconductor switch 13 to allow power to flow from line conductor 6 onto traveler conductor 8, which serves as a control signal to master processing unit 11 indicative of the adjustment to the accessory dimmer 3. Master processing unit 11 then adjusts the conduction angle of primary semiconductor switch 9 to adjust the power provided to load 5 based on the control signal, and updates master load status indicator 12 to indicate the dimming level of load 5 after the adjustment. Master processing unit 11 subsequently controls master auxiliary semiconductor switch 10 to allow power to flow from line conductor 6 onto traveler conductor 8, which serves as a control signal to all accessory dimmers 3 connected to traveler conductor 8 indicating the dimming level of load 5 after the adjustment. Accessory processing units 14 within each accessory dimmer 3 update their accessory load status indicators 15 to indicate the dimming level of load 5.

In one exemplary embodiment of dimmer switch system 1 of the disclosed concept, if a user of dimmer switch system 1 pushes a "DIM UP" or "DIM DOWN" button of an accessory dimmer 3 and continues to hold the button down, the accessory dimmer 3 will continue to transmit the corresponding control signal to master dimmer 2 via traveler conductor 8 while the button is held down and master dimmer 2 will continue to update the dimming level of load 5 and transmit corresponding control signals to accessory dimmers 3 to provide updates regarding the dimming level of load 5. If master dimmer 2 determines that the minimum or maximum dimming level has been reached, but the user continues to hold the button down, master dimmer 2 may cease to further adjust the dimming level of load 5 and instead just continue to transmit control signals to accessory dimmers 3 indicating the dimming level of load 5.

Figure 3A:
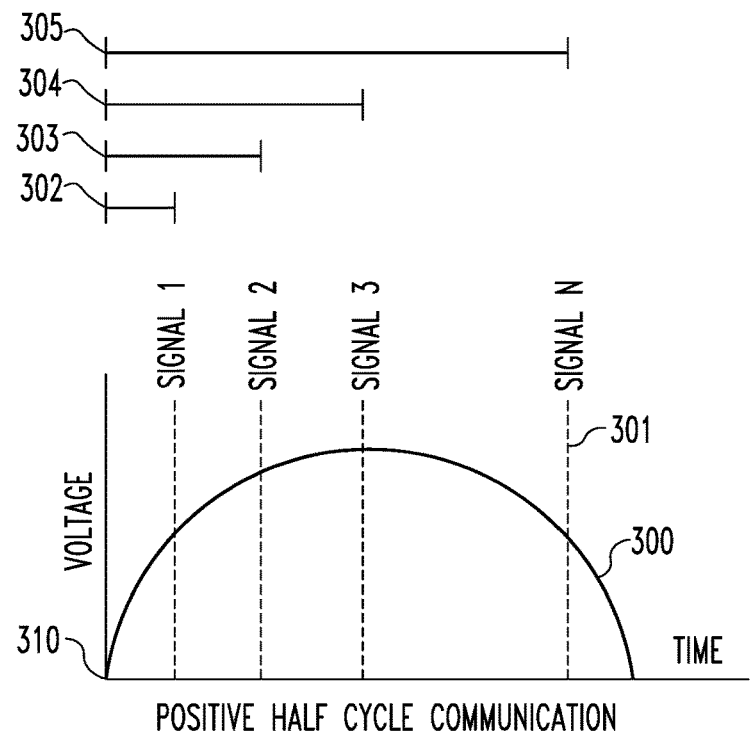
FIGS. 3A and 3B are graphs of predetermined time delays of signals transmitted from the master dimmer and an accessory dimmer during single polarity half-cycles of power from the power supply in accordance with an example embodiment of the disclosed concept.
Figure 3B:
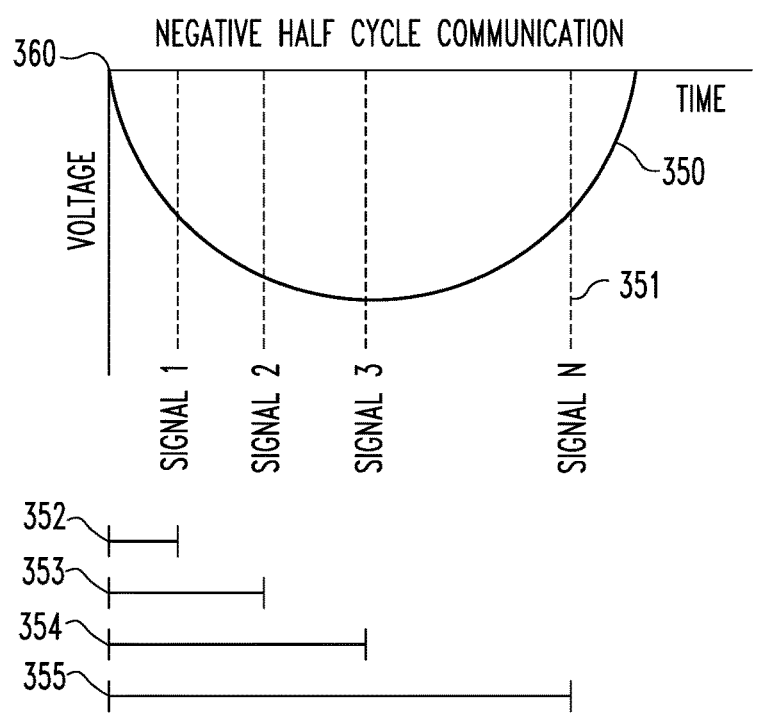

The communication scheme of dimmer switch system 1 utilizes only one traveler conductor 8 and is bidirectional, such that master dimmer 2 is able to transmit signals to accessory dimmers 3 through traveler conductor 8, and accessory dimmers 3 are also able to transmit signals to master dimmer 2 through traveler conductor 8. Power provided by power source 4 is AC and thus has both positive half-cycles and negative half-cycles of power. FIG. 3A shows a graph of a positive half-cycle 300 of power with control signals 301 transmitted after various time delays 302, 303, 304, 305 from the zero edge crossing 310 for the positive half-cycle 300 of power. FIG. 3B shows a graph of a negative half-cycle 350 of power with control signals 351 transmitted after various time delays 352, 353, 354, 355 from the zero edge crossing 360 for the negative half-cycle of power. Bidirectional communication in dimmer switch system 1 is achieved by either assigning master dimmer 2 to transmit control signals only during positive half-cycles 300 and assigning accessory dimmers 3 to transmit control signals only during negative half-cycles 350, or by assigning master dimmer 2 to transmit control signals only during negative half-cycles 350 and assigning accessory dimmers 3 to transmit control signals only during positive half-cycles 300. It will be appreciated that, so long as master dimmer 2 transmits control signals during the half-cycle of power opposite in polarity from the half-cycle of power in which accessory dimmers 3 transmit control signals, either type of dimmer may transmit signals during positive half-cycles 300 and either type of dimmer may transmit control signals negative half-cycles 350 without departing from the scope of the disclosed concept. Master processing unit 11 and accessory processing units 14 all contain edge detection circuitry such that, at any given point in time, all of the processing units know when the last zero edge crossing 310 or 360 for the current polarity half-cycle of power occurred and whether the power flowing through the dimmer switch system is in a positive half-cycle 300 or a negative half-cycle 350.

The dimmers may communicate, for example, load dimming status and load dimming commands to one another by transmitting control signals 301 or 351 via traveler conductor 8. As described above, the control signals are generated in an example embodiment of the disclosed concept by controlling a master or auxiliary semiconductor switch 10, 13 to allow power to flow from line conductor 6 onto traveler conductor 8 a predetermined time delay from a zero edge crossing 310 or 360. Master processing unit 11 and accessory processing units 14 are all programmed to cause control signals 301 or 351 with predetermined time delays of various lengths, such as 302, 303, 304, 305, 352, 353, 354, or 355, such that each unique length of time delay from a zero edge crossing 310 or 360 corresponds to a unique control signal. The depiction of time delays 302, 303, 304, 305, 352, 353, 354, or 355 is for illustrative purposes, and it will be appreciated that signals can be transmitted on time delays of any length from zero edge crossings 310 and 360 without departing from the scope of the disclosed concept. The dimming level of the load 5 is based on the conduction angle of the primary semiconductor switch 9, so the dimming level is synonymous with the conduction angle of the primary semiconductor switch 9.

In one example, master dimmer 2 is assigned to transmit signals only during positive half-cycles 300 and accessory dimmers 3 are assigned to transmit signals only during negative half-cycles 350. Both master processing unit 11 and accessory processing units 14 start timers upon detecting a zero edge crossing 310 or 360. When master processing unit 11 needs to transmit a signal 301 to accessory dimmers 3 to indicate the dimming level of load 5 after an adjustment to the conduction angle of the primary semiconductor switch 9, master processing unit 11 determines the conduction angle of the primary semiconductor switch 9, waits a length of time equal to the predetermined time delay 305 corresponding to the conduction angle, and turns master auxiliary semiconductor switch 10 to an ON state. When master auxiliary semiconductor switch 10 turns to an ON state, accessory processing units 14 detect the control signal on traveler conductor 8 and stop their timers. Accessory processing units 14 then update their accessory load status indicators 15 based on the control signal. The time measured by the timer of accessory processing unit 14 is equal to the predetermined time delay 305 on which master processing unit 11 turned master auxiliary semiconductor switch 10 to an ON state. Accessory processing units 14 interpret the time delay measured by their timers to represent the dimming level associated with the predetermined time delay 305 and update their accessory load status indicators 15 accordingly.

In the same example, when one of accessory processing units 14 needs to transmit a signal to master dimmer 2 indicating a desired change to the dimming level of load 5 based on an adjustment made to an accessory dimmer 3, the accessory processing unit 14 of the adjusted accessory dimmer 3 waits a length of time equal to the predetermined time delay 355 corresponding to the desired dimming level adjustment, and turns its accessory auxiliary semiconductor switch 13 to an ON state. When the accessory auxiliary semiconductor switch 13 turns to an ON state, master processing unit 11 detects the control signal on traveler conductor 8 and stops its timer. Master processing unit 11 changes the conduction angle of primary semiconductor switch 9 and updates master load status indicator 12 based on the control signal. The time measured by the timer of master processing unit 11 is equal to the predetermined time delay 355 on which the accessory processing unit 14 turned the accessory auxiliary semiconductor switch 13 to an ON state. Master processing unit 11 interprets the time delay measured by its timer to represent the dimming level associated with the predetermined time delay 355 and updates the conduction angle of primary semiconductor switch 9 and master load status indicator 12 accordingly. Master processing unit 11 subsequently transmits a signal to all accessory dimmers 3 to update their load status indicators 15 as previously described.

In another example, master dimmer 2 is again assigned to transmit signals only during positive half-cycles 300 and accessory dimmers 3 are assigned to transmit signals only during negative half-cycles 350. Both master processing unit 11 and accessory processing units 14 start timers upon detecting a zero edge crossing 310 or 360. In this example, during every other positive half-cycle 300, master processing unit 11 transmits a signal 301 to accessory dimmers 3 to indicate whether master dimmer 2 is ON or OFF. During the other of the every other positive half-cycle 300, master processing unit 11 transmits a signal 301 to accessory dimmers 3 indicating the conduction angle of primary semiconductor switch 9. During a positive half-cycle 300 designated for communicating the DIMMER ON/DIMMER OFF state of master dimmer 2, master processing unit 11 determines if the conduction angle of the primary semiconductor switch 9 is that of a DIMMER ON or DIMMER OFF state, waits a length of time equal to the predetermined time delay 305 corresponding to a DIMMER ON state or DIMMER OFF state as appropriate, and turns master auxiliary semiconductor switch 10 to an ON state. When master auxiliary semiconductor switch 10 turns to an ON state, accessory processing units 14 detect the control signal on traveler conductor 8 and stop their timers. Accessory processing units 14 then update their accessory load status indicators 15 based on the control signal. The time measured by the timer of accessory processing unit 14 is equal to the predetermined time delay 305 on which master processing unit 11 turned master auxiliary semiconductor switch 10 to an ON state. Accessory processing units 14 interpret the time delay measured by their timers to represent the DIMMER ON/DIMMER OFF state of master dimmer 2 associated with the predetermined time delay 305 and update their accessory load status indicators 15 accordingly. The time delay 305 representing a DIMMER ON state of master dimmer 2 and the time delay 305 representing a DIMMER OFF state of master dimmer 2 are unique compared to one other and unique compared to the time delays 305 representing each of the possible levels of dimming of load 5. For example, if accessory processing units 14 receive a DIMMER ON control signal from master processing unit 11 while accessory load status indicators 15 already indicate that master dimmer 2 is ON, i.e. while accessory load status indicators 15 indicate some level of dimming of load 5, then accessory load status indicators 15 would not change their status. If however, accessory load status indicators 15 receive a DIMMER OFF control signal from the master processing unit 11 while accessory load status indicators 15 indicate that master dimmer 2 is ON, accessory load status indicators 15 would change their status to indicate an OFF state. If accessory load status indicators 15 receive a DIMMER ON control signal from master processing unit 11 while accessory load status indicators 15 indicate that master dimmer 2 is OFF, accessory load status indicators 15 would not change until the next positive half-cycle, when they receive a control signal from master processing unit 11 indicating the current conduction angle of primary semiconductor switch 9.

In some example embodiments, master dimmer 2 may periodically (e.g., without limitation, every 1 sec.) transmit dimming level updates to accessory dimmers 3. Alternatively or additionally, accessory dimmers 3 may periodically, or on an on-demand basis, request dimming level updates from master dimmer 2. For example, an accessory dimmer 3 just powering on may request that master dimmer 2 provide an update on the dimming level of load 5, and, in response, master dimmer 2 may provide a current dimming level of load 5 to all accessory dimmers 3 via traveler conductor 8. The time delay 305 representing a request for the current dimming level of load 5 is unique compared to the time delays 305 representing each of the possible levels of dimming of load 5.

In one exemplary embodiment of the disclosed concept, each of the accessory processing units 14 and master processing unit 11 are programmed with an error tolerance such that, if any noise affects the transmission time of the control signal generated by master auxiliary semiconductor switch 10 turning to an ON state or accessory auxiliary semiconductor switch 13 turning to an ON state, accessory processing units 14 and master processing unit 11 would be able to correctly interpret the information encoded in the transmitted control signal. For example, if each accessory processing unit 14 and master processing unit 11 is programmed to have a tolerance of 200 μs, and a control signal generated 1.5 ms after a zero crossing was not received by each accessory processing unit 14 or master processing unit 11 until 1.65 ms after the zero crossing, each accessory processing unit 14 or master processing unit 11 would still be able to correctly interpret the encoded information as if the signal had been received 1.5 ms after the zero crossing. Similarly, in the same example with a tolerance of 200 μs, if a control signal generated 1.5 ms after a zero crossing was received 1.35 ms after the zero crossing by each accessory processing unit 14 or master processing unit 11, each accessory processing unit 14 or master processing unit 11 would still be able to correctly interpret the encoded information as if the signal had been received 1.5 ms after the zero crossing. A tolerance of 200 μs is used for illustrative purposes only and it will be appreciated that error tolerances of other magnitudes may be employed without departing from the scope of the disclosed concept.

Figure 4:
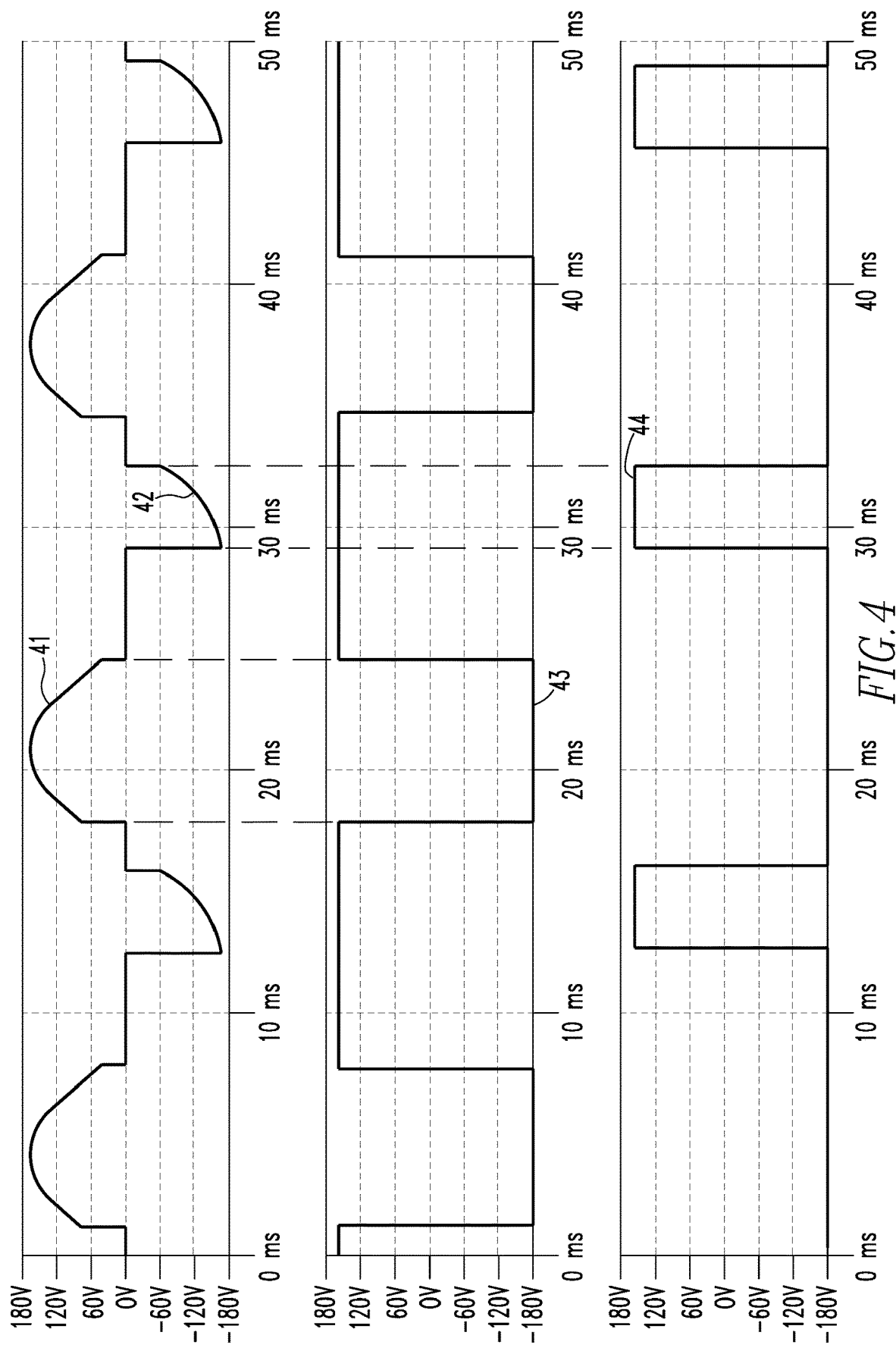
FIG. 4 shows graphs depicting transmission of control signals by the master dimmer and an accessory dimmer during opposite polarity half-cycles of power in accordance with an example embodiment of the disclosed concept.

FIG. 4 shows graphs depicting: (1) master dimmer 2 transmitting signals 301 during positive half-cycles of power 300, (2) accessory dimmers 3 receiving and decoding signals 301 transmitted by master dimmer 2 during positive half-cycles of power 300, (3) an accessory dimmer 3 transmitting signals 351 during negative half-cycles of power 350, and (4) master dimmer 2 receiving and decoding signals 351 transmitted by accessory dimmer 3 during negative half-cycles of power 350 in accordance with an example embodiment of the disclosed concept.

The top graph of FIG. 4 depicts an example waveform of power flowing through traveler conductor 8. As shown in the top graph of FIG. 4, a first control signal 41 is generated on traveler conductor 8 by master dimmer 2 a first predetermined time into a positive half-cycle of power. A second control signal 42 is generated on traveler conductor 8 by an accessory dimmer 3 a second predetermined time into a negative half-cycle of power. The middle graph of FIG. 4 depicts an example of decoded control signals 43 received by an accessory dimmer 3. As shown in the middle graph of FIG. 4, the decoded control signals 43 begin each positive half-cycle in a high state and change to a low state each time a control signal is generated on the traveler conductor 8 during a positive half-cycle. These decoded control signals 43 can be used to determine the predetermined time delay of the control signal from master dimmer 2, and the accessory dimmer 3 can, in turn, perform an action associated with the predetermined time delay. The bottom graph of FIG. 4 depicts an example of decoded control signals 44 received by master dimmer 2. As shown in the bottom graph of FIG. 4, the decoded control signals 44 begin each positive half-cycle in the low state and change to a high state each time a control signal is generated on the traveler conductor 8 during a negative half-cycle. These decoded control signals 44 can be used to determine the predetermined time delay of the control signal from an accessory dimmer 3, and the master dimmer 2 can, in turn, perform an action associated with the predetermined time delay. The graphs shown in FIG. 4 depict master dimmer 2 transmitting signals during positive half-phases of power and accessory dimmers 3 transmitting signals during negative half-phases of power; however, it will be appreciated that master dimmer 2 may transmit signals during negative half-phases of power while accessory dimmers 3 transmit signals during positive half-phases of power without departing from the scope of the disclosed concept. It will be appreciated that the graphs shown in FIG. 4 depict a non-limiting example to aid in understanding the communication scheme between master dimmer 2 and accessory dimmers 3. The various states of the signals and their timing may be modified without departing from the scope of the disclosed concept.

Figure 5:
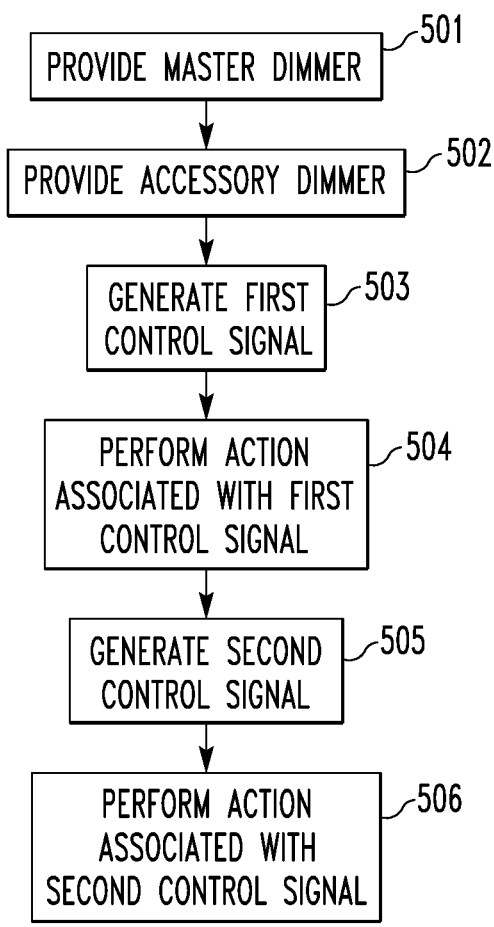
FIG. 5 is a flow chart of a first method of dimming a load in accordance with an example embodiment of the disclosed concept.

FIG. 5 is a flowchart of a method of dimming a load connected to a dimmer switch system in accordance with an example embodiment of the disclosed concept. The method of FIG. 5 may be employed, for example, with dimmer switch system 1 shown in FIGS. 1, 2A, and 2B and is described in conjunction with dimmer switch system 1 shown in FIGS. 1, 2A, and 2B. However, it will be appreciated that the method may be employed in other devices as well without departing from the scope of the disclosed concept. The method begins at 501 where master dimmer 2 is provided. At 502, accessory dimmer 3 is provided. At 503, master dimmer 2 generates a first control signal. The first control signal is generated in one of the positive or negative half-cycle of power from power source 4 and is generated a first predetermined time after a zero crossing beginning said half-cycle. At 504, an action associated with the first control signal (e.g., an action associated with the first predetermined time after the zero crossing) is performed. One example of an action associated with the first control signal is updating accessory load status indicator 15. However, it will be appreciated that other actions may be associated with the first control signal without departing from the scope of the disclosed concept. At 505, accessory dimmer 3 generates a second control signal. The second control signal is generated in the other of the positive or negative half-cycle of power from power source 4 and is generated a second predetermined time after a zero crossing beginning said half-cycle. At 506, an action associated with the second control signal (e.g., an action associated with the second predetermined time after the zero crossing) is performed. One example of an action associated with the second control signal is adjusting the conduction angle of primary semiconductor switch 9. However, it will be appreciated that other actions may be associated with the second control signal without departing from the scope of the disclosed concept.

Figure 6:
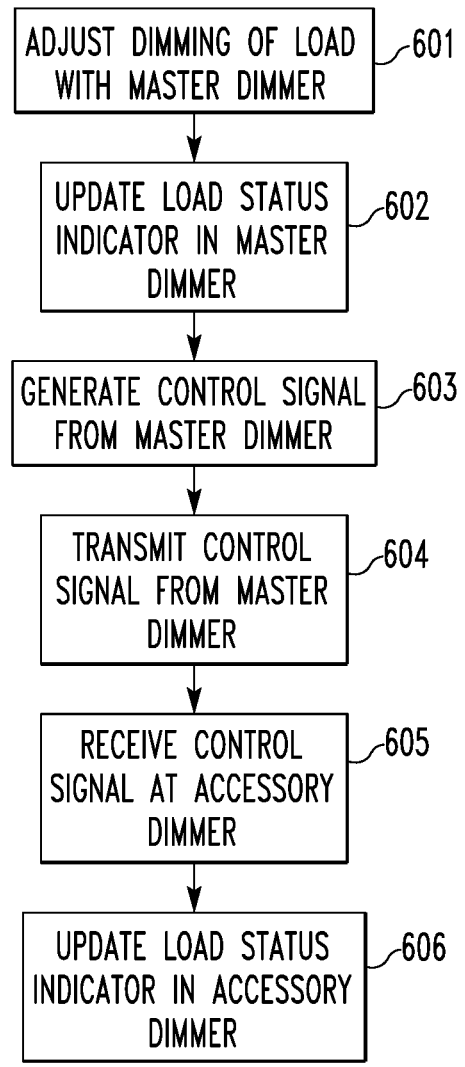
FIG. 6 is a flow chart of a second method of dimming a load in accordance with an example embodiment of the disclosed concept.

FIG. 6 is a flowchart of a second method of dimming a load connected to a dimmer switch system in accordance with an example embodiment of the disclosed concept. The method of FIG. 6 may be employed, for example, with dimmer switch system 1 shown in FIGS. 1, 2A, and 2B and is described in conjunction with dimmer switch system 1 shown in FIGS. 1, 2A, and 2B. However, it will be appreciated that the method may be employed in other devices as well without departing from the scope of the disclosed concept. The method of FIG. 6 is an example of updating load status indicators based on an adjustment in dimming at a master dimmer in accordance with an example embodiment of the disclosed concept. The method begins at 601 where the dimming of load 5 is adjusted by master dimmer 2. It will be appreciated that in an example embodiment, the dimming level of load 5 may include an on/off designation such that the adjustment by master dimmer 2 to the dimming level of load 5 includes turning load 5 on/off. At 602, master load status indicator 12 is updated in master dimmer 2 by master processing unit 11. At 603, a control signal is generated by master dimmer 2. The control signal is generated in one of the positive or negative half-cycle of power from power source 4 at a predetermined time associated with the dimming level of load 5. At 604, the control signal is transmitted by master dimmer 2 to accessory dimmers 3 via traveler conductor 8. At 605, the control signal is received by an accessory dimmer 3. At 606, accessory load status indicator 15 of the accessory dimmer 3 is updated by accessory processing unit 14 based on the control signal.

Figure 7:
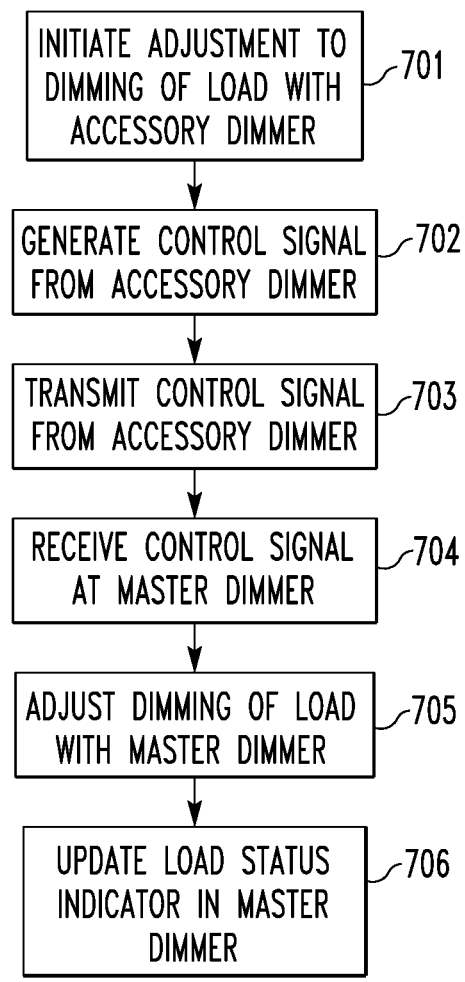
FIG. 7 is a flow chart of a third method of dimming a load in accordance with an example embodiment of the disclosed concept.

FIG. 7 is a flowchart of a third method of dimming a load connected to a dimmer switch system in accordance with an example embodiment of the disclosed concept. The method of FIG. 7 may be employed, for example, with dimmer switch system 1 shown in FIGS. 1, 2A, and 2B and is described in conjunction with dimmer switch system 1 shown in FIGS. 1, 2A, and 2B. However, it will be appreciated that the method may be employed in other devices as well without departing from the scope of the disclosed concept. The method begins at 701 where an adjustment to the dimming of load 5 is initiated by an accessory dimmer 3, for example by a user interacting with dimming controls on the accessory dimmer 3. At 702, a control signal is generated by the accessory dimmer 3 during the other of the positive or negative half-cycle of power from power source 4 (i.e., the half-cycle not used by master dimmer 2). The control signal is generated a predetermined time after a zero crossing starting the half-cycle and the predetermined time is associated with the adjustment to the dimming (e.g., turn off, turn on, dim up, or dim down). At 703, the control signal is transmitted by the accessory dimmer 3 to master dimmer 2 via traveler conductor 8. At 704, the control signal is received by master dimmer 2. At 705, the dimming of load 5 is adjusted by master dimmer 2 in accordance with the control signal received. At 706, master load status indicator 12 is updated by master processing unit 11.

While the disclosed concept has been described in association with adjusting dimming levels and updating load status indicators, it will be appreciated that the control signals described herein may be used in association with other types of information or other types of commands. For example, the communication scheme may be used to send any type of command or information from master dimmer 2 to accessory dimmers 3 and/or from accessory dimmers 3 to master dimmer 2 without departing from the scope of the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A dimmer switch system for dimming a load, the dimmer switch system comprising:
   a master dimmer structured to be electrically connected to a power source and the load and to control dimming of the load by regulating power provided from the power source to the load; and
   at least one accessory dimmer structured to be electrically connected to the master dimmer via a traveler conductor,
   wherein the master dimmer is structured to generate a first control signal on the traveler conductor during one of a positive or negative half-cycle of power from the power source, and
   wherein the at least one accessory dimmer is structured to generate a second control signal on the traveler conductor during the other of the positive or negative half-cycle of power from the power source.

2. The dimmer switch system of claim 1,
   wherein the master dimmer further comprises:
      a first processing unit;
      a primary semiconductor switch structured to be electrically connected between the power source and the load;
      a first auxiliary semiconductor switch, and
   wherein the at least one accessory dimmer further comprises:
      a second processing unit;
      a second auxiliary semiconductor switch.

3. The dimmer switch system of claim 2,
   wherein the first auxiliary semiconductor switch and the second auxiliary semiconductor switch are structured to be electrically connected between the power source and the traveler conductor,
   wherein the first processing unit is structured to control the first auxiliary semiconductor switch to generate the first control signal on the traveler conductor during one of the positive or negative half-cycle of power from the power source, and
   wherein the second processing unit is structured to control the second auxiliary semiconductor switch to generate the second control signal on the traveler conductor during the other of the positive or negative half-cycle of power from the power source.

4. The dimmer switch system of claim 1,
   wherein the master dimmer further comprises a first load status indicator, and
   wherein the at least one accessory dimmer further comprises a second load status indicator.

5. The dimmer switch system of claim 4,
   wherein, upon an adjustment to a dimming level of the load by the master dimmer, the master dimmer is structured to update the first load status indicator to denote the dimming level of the load,
   wherein the master dimmer is structured to generate the first control signal to denote the dimming level of the load and to transmit the first control signal to the at least one accessory dimmer, and
   wherein the at least one accessory dimmer is structured to update the second load status indicator upon receipt of the first control signal.

6. The dimmer switch system of claim 4,
   wherein, upon an adjustment to a dimming level of the load initiated by an adjustment at one of the at least one accessory dimmer, the adjusted accessory dimmer is structured to generate the second control signal to indicate the adjustment to the dimming level of the load and to transmit the second control signal to the master dimmer, and
   wherein, upon receipt of the second control signal transmitted by the adjusted accessory dimmer, the master dimmer is structured to adjust the dimming level of the load and to update the first load status indicator to denote the adjusted dimming level of the load and to generate the first control signal to denote the adjusted dimming level of the load and to transmit the first control signal to the at least one accessory dimmer.

7. The dimmer switch system of claim 1,
   wherein the master dimmer is structured to generate the first control signal at a first predetermined time in the one of the positive or negative half-cycle of power from the power source, and
   wherein the at least one accessory dimmer is structured to determine the first predetermined time of the first control signal and to perform an action associated with the first predetermined time.

8. The dimmer switch system of claim 7, wherein the action is to provide a visual indication of a status of the load associated with the first predetermined time.

9. The dimmer switch system of claim 1,
   wherein the at least one accessory dimmer is structured to generate the second control signal at a second predetermined time in the one of the positive or negative half-cycle of power from the power source, and
   wherein the master dimmer is structured to determine the second predetermined time of the second control signal and to perform an action associated with the second predetermined time.

10. The dimmer switch system of claim 9, wherein the action is to adjust a dimming level of the load and to provide a visual indication of a status of the load associated with the second predetermined time.

11. A method of dimming a load, the method comprising:
    providing a master dimmer electrically connected to a power source and the load and controlling dimming of the load by regulating power provided from the power source to the load with the master dimmer;
    providing at least one accessory dimmer electrically connected to the master dimmer via a traveler conductor;
    generating a first control signal on the traveler conductor with the master dimmer during one of a positive or negative half-cycle of power from the power source; and
    generating a second control signal on the traveler conductor with the at least one accessory dimmer during the other of the positive or negative half-cycle of power from the power source.

12. The method of claim 11,
    wherein the master dimmer includes a first processing unit, a primary semiconductor switch structured to be electrically connected between the power source and the load, and a first auxiliary semiconductor switch, and
    wherein the at least one accessory dimmer includes a second processing unit and a second auxiliary semiconductor switch.

13. The method of claim 12, further comprising:
electrically connecting the first auxiliary semiconductor switch and the second auxiliary semiconductor switch between the power source and the traveler conductor;
controlling the first auxiliary semiconductor switch with the first processing unit to generate the first control signal on the traveler conductor during one of the positive or negative half-cycle of power from the power source; and
controlling the second auxiliary semiconductor switch with the second processing unit to generate the second control signal on the traveler conductor during the other of the positive or negative half-cycle of power from the power source.

14. The method of claim 11,
wherein the master dimmer includes a first load status indicator, and
wherein the at least one accessory dimmer includes a second load status indicator.

15. The method of claim 14, further comprising:
adjusting a dimming level of the load with the master dimmer;
updating the first load status indicator with the master dimmer to denote the dimming level of the load;
generating the first control signal from the master dimmer to denote the dimming level of the load;
transmitting the first control signal from the master dimmer to the at least one accessory dimmer;
receiving the first control signal at the at least one accessory dimmer; and
updating the second load status indicator with the at least one accessory dimmer.

16. The method of claim 14, further comprising:
adjusting one of the at least one accessory dimmer to initiate an adjustment to a dimming level of the load;
generating the second control signal from the one of the at least one accessory dimmer to indicate the adjustment to the dimming level of the load;
transmitting the second control signal from the one of the at least one accessory dimmer to the master dimmer;
receiving the second control signal at the master dimmer;
adjusting the dimming level of the load with the master dimmer;
updating the first load status indicator with the master dimmer to denote the adjusted dimming level of the load;
generating the first control signal from the master dimmer to denote the adjusted dimming level of the load; and
transmitting the first control signal from the master dimmer to the at least one accessory dimmer.

17. The method of claim 11, further comprising:
generating the first control signal from the master dimmer at a first predetermined time in the one of the positive or negative half-cycle of power from the power source;
determining the first predetermined time of the first control signal with the at least one accessory dimmer; and
performing an action associated with the first predetermined time with the at least one accessory dimmer.

18. The method of claim 11, further comprising:
generating from one of the at least one accessory dimmer the second control signal at a second predetermined time in the one of the positive or negative half-cycle of power from the power source;
determining the second predetermined time of the second control signal with the master dimmer; and
performing an action associated with the second predetermined time with the master dimmer.

19. A dimmer switch system for dimming a load, the dimmer switch system comprising:
a master dimmer structured to be electrically connected to a power source and the load and to control dimming of the load by regulating power provided from the power source to the load; and
at least one accessory dimmer structured to be electrically connected to the master dimmer via a traveler conductor,
wherein the master dimmer is structured to generate a first control signal on the traveler conductor a first predetermined time after a first zero crossing in power from the power source,
wherein the at least one accessory dimmer is structured to generate a second control signal on the traveler conductor a second predetermined time after a second zero crossing in power from the power source.

20. The dimmer switch system of claim 19,
wherein the at least one accessory dimmer is structured to determine the first predetermined time of the first control signal and to perform a first action associated with the first predetermined time,
wherein the master dimmer is structured to determine the second predetermined time of the second control signal and to perform a second action associated with the second predetermined time.

* * * * *